United States Patent

Hoenninger et al.

[11] Patent Number: 6,076,631
[45] Date of Patent: Jun. 20, 2000

[54] BASS REFLEX BOX OF AN AUTOMOBILE RADIO-SOUND SYSTEM

[75] Inventors: Anton Hoenninger, Lauda-Koenigshofen; Karl Kuebler, Freiberg, both of Germany

[73] Assignee: DaimlerChrysler AG, Stuttgart, Germany

[21] Appl. No.: 09/357,853

[22] Filed: Jul. 21, 1999

[30] Foreign Application Priority Data

Jul. 21, 1998 [DE] Germany .......................... 198 32 623
Apr. 29, 1999 [DE] Germany .......................... 199 19 456

[51] Int. Cl.⁷ .................................................. H05K 5/00
[52] U.S. Cl. .............................................. 181/141; 381/86
[58] Field of Search .................... 181/141, 150, 181/156; 381/86, 334, 302

[56] References Cited

U.S. PATENT DOCUMENTS

| | | |
|---|---|---|
| 3,882,962 | 5/1975 | Ripple . |
| 4,580,653 | 4/1986 | Owens ...................... 181/141 |
| 5,218,175 | 6/1993 | Scarlata . |
| 5,287,412 | 2/1994 | Etzel et al. ................. 381/86 |
| 5,591,946 | 1/1997 | Jehle et al. ................. 181/141 |

FOREIGN PATENT DOCUMENTS

| | | |
|---|---|---|
| 0 252 522 | 1/1988 | European Pat. Off. . |
| 0 653 331 | 5/1995 | European Pat. Off. . |
| 36 08 048 | 10/1987 | Germany . |
| 39 02 437 | 8/1990 | Germany . |
| 41 25 893 | 3/1992 | Germany . |
| 41 21 408 | 1/1993 | Germany . |
| 63-090993 | 4/1988 | Japan . |
| 5-220041 | 8/1993 | Japan . |
| 6-113382 | 4/1994 | Japan . |

*Primary Examiner*—Khanh Dang
*Attorney, Agent, or Firm*—Evenson, McKeown, Edwards & Lenahan, PLLC

[57] ABSTRACT

A bass reflex box of a radio-sound system of an automobile is designed to be accommodated compactly and with good sound generating effect in the vehicle interior. For this purpose, the bass reflex box, which can be designed as an energy-absorbing crash element, is installed in a space between the firewall that separates the vehicle interior from the engine compartment and a foot support plate located in the vehicle interior at a distance from the firewall and tilted upward relative to the vehicle interior floor, with bass output openings extending into the vehicle interior above the foot support plate. The foot support plate can be eliminated and its function assumed directly by the bass reflex box itself.

14 Claims, 2 Drawing Sheets

BASS REFLEX BOX OF AN AUTOMOBILE RADIO-SOUND SYSTEM

BACKGROUND AND SUMMARY OF THE INVENTION

This application claims the priorities of German Application Nos. 198 32 623.8, filed Jul. 21, 1998, and 199 19 456.4, filed Apr. 29, 1999, the disclosures of which are expressly incorporated by reference herein.

The invention relates to a bass reflex box of a radio-sound system of an automobile.

Bass reflex boxes require a relatively large volume for installation, for which sufficient space is frequently unavailable in the interior of an automobile. In order to satisfy a desire for powerful bass from the sound system for the driver and passenger, a bass reflex box located in the back of a vehicle interior requires a volume on the order of at least 15 liters.

The invention is thus concerned with the problem of how to accommodate a bass reflex box with a relatively large volume in the interior of an automobile without an associated perceived reduction of interior or cargo space, which could be disturbing. In addition, a location accommodating such a box must be selected at which the sound effect provided for the vehicle occupants is as good as possible.

This problem is solved according to the present invention by locating the bass reflex box in the passenger foot area against the firewall that separates the vehicle interior from the engine compartment. Bass output openings from the box lead into the interior of the vehicle in the upper area, which is, as a rule, not contacted by the passenger's feet.

Advantageous embodiments of the present invention are described herein.

The invention is based on the general idea of selecting a location for installing the bass reflex box where space is available, without reducing the space in the interior or in the cargo compartment, while still producing optimum sound effects for the vehicle occupants. The bass reflex box according to the invention can be accommodated especially compactly when it also forms a front foot support area within the foot space of the passenger. This box can be covered by floor coverings, such as carpeting, with the carpet being even integrated into the surface of the box. With clever design, an intermediate layer that absorbs impact energy can be at least largely eliminated from the front foot support area below the floor carpeting. The bass reflex box can advantageously also be designed as a crash element itself so that it absorbs energy in the event of a collision.

Other objects, advantages and novel features of the present invention will become apparent from the following detailed description of the invention when considered in conjunction with the accompanying drawings.

DETAILED DESCRIPTION OF THE DRAWINGS

Figure 1:
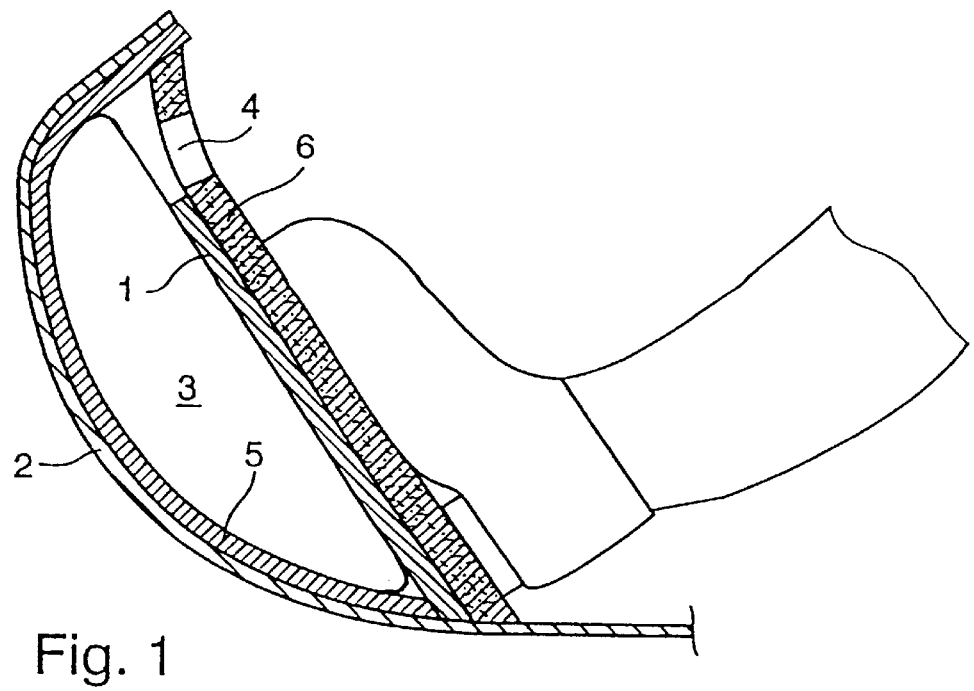
FIG. 1 is a cross-section in the lengthwise direction of the vehicle through the area of a foot support plate in the passenger area of an automobile accommodating a bass reflex box.
Figure 2:
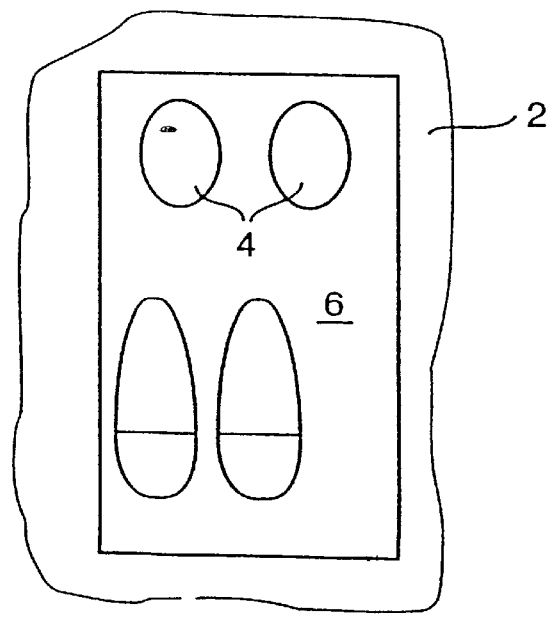
FIG. 2 is a view of the foot support plate as seen from the interior of the vehicle.

A foot support plate 1 is mounted at a distance in front of a firewall 2 that divides the engine compartment from the interior of an automobile. The fire wall 2 is covered with a damping layer 5 on the side facing the interior. The wedge-shaped space produced by this kind of installation between foot support plate 1 and damping layer 5 of firewall 2 serves as space to accommodate a bass reflex box 3. Such a bass reflex box 3, with a volume of 10 liters for example, is designed in terms of its exterior dimensions precisely for the available installation space, so that an approximately shape-wise installation within the space between the foot support plate 1 and the firewall 2 is provided.

The sound outputs of bass reflex box 3 are in the form of two openings 4 in carpeting 6 covering the foot support plate 1. These openings 4 are located in an area of the carpeting 6 that projects beyond the foot support plate 1 at the top, and terminate there in the passenger compartment. By providing a bass reflex box 3 in the front passenger foot space, an optimum sound effect can be produced within the vehicle interior with a bass reflex box volume of approximately 10 liters, which otherwise could be achieved by mounting the bass reflex box in the back of the passenger compartment only with a bass reflex box volume of at least 15 liters.

With a sufficiently large installation space below the foot support plate 1, the audio amplifier of the radio-sound system can be integrated into the bass reflex box or can be accommodated together with the box in the space below the foot support plate 1.

Figure 3:
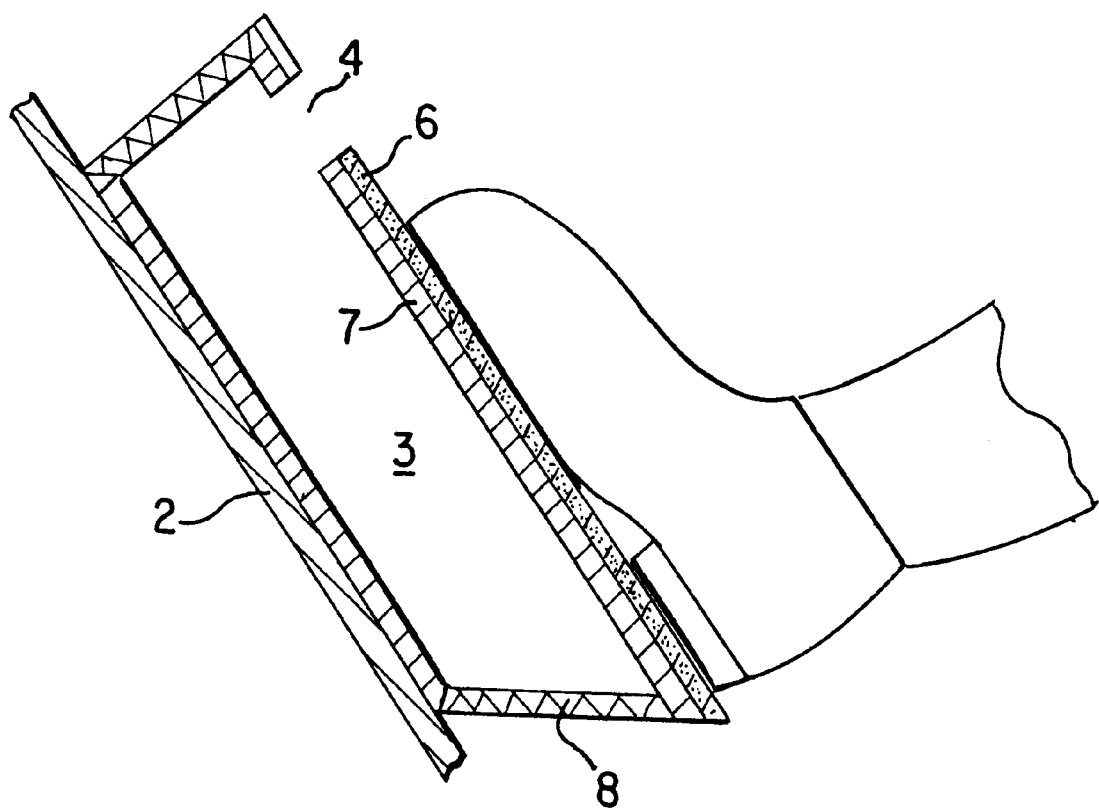
FIG. 3 illustrates the bass reflex box designed as a crash element with a portion thereof forming a foot support plate.

With a suitably stable design, the foot support plate 1 located in front of the bass reflex box described above can be eliminated. In this case, as shown in FIG. 3, the bass reflex box 3 itself serves as a front foot support area 7. This area can be covered as usual by floor carpeting 6. Then, as is likewise conventional, an impact-energy-absorbing intermediate layer can be provided between the carpet and the bass reflex box. This intermediate layer however can also be integrated into the floor covering and/or into the bass reflex box. The floor covering, with or without an intermediate layer, can also be integrated as a whole into the surface of the bass reflex box. The bass reflex box can be designed with energy absorbing characteristics 8 as well to function as a crash element.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle radio-sound system speaker arrangement, comprising:

a passenger foot area of the vehicle defined by a firewall separating a vehicle interior from an engine compartment;

a bass reflex box located in the passenger foot area, bass output openings from the box being arranged in an upper portion of the passenger foot area which is generally not contacted by a passenger's feet, the bass output openings leading into the vehicle interior.

2. The arrangement according to claim 1, wherein the bass reflex box is delimited by damping material at the firewall.

3. The arrangement according to claim 1, wherein the bass reflex box forms a front foot support area within the passenger foot area.

4. The arrangement according to claim 2, wherein the bass reflex box forms a front foot support area within the passenger foot area.

5. The arrangement according to claim 1, further comprising:
foot support plate forming a foot support area within the passenger foot area, the foot support plate being located in front of and exterior to the bass reflex box.

6. The arrangement according to claim 2, further comprising:
a foot support plate forming a foot support area within the passenger foot area, the foot support plate being located in front of and exterior to the bass reflex box.

7. The arrangement according to claim 1, wherein the bass reflex box has a wedge-shape, a thick end of the wedge-shape being directed upward within the passenger foot area.

8. The arrangement according to claim 2, wherein the bass reflex box has a wedge-shape, a thick end of the wedge-shape being directed upward within the passenger foot area.

9. The arrangement according to claim 3, wherein the bass reflex box has a wedge-shape, a thick end of the wedge-shape being directed upward within the passenger foot area.

10. The arrangement according to claim 5, wherein the bass reflex box has a wedge-shape, a thick end of the wedge-shape being directed upward within the passenger foot area.

11. The arrangement according to claim 1, wherein the bass reflex box is designed in an energy-absorbing manner to deform as a crash element.

12. A process for assembling a bass reflex box of a radio-sound system in a vehicle, the process comprising the acts of:

manufacturing the vehicle to have a passenger foot space separated from an engine compartment via a firewall;

locating the bass reflex box within the passenger foot space against the firewall; and arranging bass output openings from the bass reflex box in a portion of a foot support area which is generally not in contact with passenger's feet.

13. The process according to claim 12, wherein the bass reflex box is arranged to be tilted upward relative to a floor of the vehicle.

14. The process according to claim 12, wherein the bass reflex box is designed as an energy-absorbing crash element.

* * * * *